US012810153B2

(12) United States Patent
Singh et al.

(10) Patent No.: US 12,810,153 B2
(45) Date of Patent: Nov. 24, 2026

(54) MACHINE LEARNING TECHNIQUES FOR DISAMBIGUATING UNSTRUCTURED DATA FIELDS FOR MAPPING TO DATA TABLES

(71) Applicant: Optum, Inc., Minnetonka, MN (US)

(72) Inventors: Sanjay Kumar Singh, Bengaluru (IN); Subhasis Jethy, Bangalore (IN); Udit Saini, Bhupatwala Haridwar (IN); Ranju Das, Seattle, WA (US); Vasant Manohar, Bothell, WA (US); Rahul Bhotika, Bellevue, WA (US); Carlos W. Morato, Sammamish, WA (US)

(73) Assignee: Optum, Inc., Minnetonka, MN (US)

( * ) Notice: Subject to any disclaimer, the term of this patent is extended or adjusted under 35 U.S.C. 154(b) by 690 days.

(21) Appl. No.: 18/322,091

(22) Filed: May 23, 2023

(65) Prior Publication Data

US 2024/0394526 A1 Nov. 28, 2024

(51) Int. Cl.
*G06N 3/08* (2023.01)

(52) U.S. Cl.
CPC .................................... *G06N 3/08* (2013.01)

(58) Field of Classification Search
CPC .......... G06N 20/00; G06N 20/20; G06N 3/02; G06N 3/08; G06N 3/045
USPC .............................................. 706/12, 15, 25
See application file for complete search history.

(56) References Cited

U.S. PATENT DOCUMENTS 7,822,768 B2 10/2010 Maymir-Ducharme et al.
9,626,451 B2 4/2017 Dietrich et al.
10,191,969 B2 1/2019 Yan
10,726,025 B2 7/2020 Guo et al.
11,170,166 B2 11/2021 Bellegarda et al.
11,354,582 B1 6/2022 Prat et al.
11,366,966 B1 * 6/2022 Ramsey ................ G06F 40/295
12,242,945 B1 3/2025 Everest
(Continued)

FOREIGN PATENT DOCUMENTS

CN 113505590 A * 10/2021 ............. G06F 40/30
WO 2019/203863 A1 10/2019
(Continued)

OTHER PUBLICATIONS

Luo et al., "Implementing a Portable Clinical NLP System with a Common Data Model—a Lisp Perspective", 2018 IEEE International Conference on Bioinformatics and Biomedicine (BIBM), Dec. 3-6, 2018, pp. 461-466. (Year: 2018).*
(Continued)

*Primary Examiner* — Hwei-Min Lu
(74) *Attorney, Agent, or Firm* — Alston & Bird LLP

(57) ABSTRACT

Various embodiments of the present disclosure provide methods, apparatus, systems, computing devices, computing entities, and/or the like for disambiguating data fields mapped to a plurality of data tables according to a common data model by generating disambiguation embeddings based on a matrix representation of the common data model and one or more logical data type weights, generating a plurality of input embedding vectors for one or more prediction inputs based on the disambiguation embeddings, generating a plurality of prediction vectors based on the plurality of input embedding vectors, and assigning one or more select data fields to respective one or more candidate data tables based on the plurality of prediction vectors.

20 Claims, 9 Drawing Sheets

(56) References Cited

U.S. PATENT DOCUMENTS

| | | | | |
|---|---|---|---|---|
| 2017/0011107 | A1 | 1/2017 | Shet et al. | |
| 2018/0137404 | A1* | 5/2018 | Fauceglia | G06N 3/044 |
| 2018/0150808 | A1 | 5/2018 | Haley et al. | |
| 2018/0189265 | A1* | 7/2018 | Chen | G06F 17/18 |
| 2018/0253669 | A1 | 9/2018 | Thunoli et al. | |
| 2019/0279101 | A1* | 9/2019 | Habti | G06F 16/221 |
| 2020/0110809 | A1 | 4/2020 | Defelice | |
| 2020/0201834 | A1* | 6/2020 | Ye | G06F 16/284 |
| 2020/0349129 | A1* | 11/2020 | Bracholdt | G06F 16/24578 |
| 2020/0380212 | A1* | 12/2020 | Butler | G06F 16/211 |
| 2021/0183484 | A1 | 6/2021 | Shaib et al. | |
| 2021/0295822 | A1* | 9/2021 | Tomkins | G06F 16/2237 |
| 2021/0406283 | A1* | 12/2021 | Chatbri | G06F 16/2456 |
| 2022/0198286 | A1 | 6/2022 | Prat et al. | |
| 2022/0207343 | A1 | 6/2022 | Lei et al. | |
| 2022/0269663 | A1* | 8/2022 | Raphael | G06F 16/2282 |
| 2022/0350810 | A1* | 11/2022 | Majumdar | G06N 20/00 |
| 2022/0358373 | A1 | 11/2022 | Bucher et al. | |
| 2022/0374735 | A1 | 11/2022 | Rathod et al. | |
| 2023/0038256 | A1 | 2/2023 | Tal et al. | |
| 2023/0290114 | A1 | 9/2023 | Prat et al. | |
| 2023/0325366 | A1* | 10/2023 | Erett | G06F 16/214<br>707/690 |

FOREIGN PATENT DOCUMENTS

| | | | | |
|---|---|---|---|---|
| WO | 2019/227073 | A1 | 11/2019 | |
| WO | WO-2019229769 | A1 * | 12/2019 | G06F 16/3331 |

OTHER PUBLICATIONS

Xie et al., "Joint Entity Linking for Web Tables with Hybrid Semantic Matching", in Krzhizhanovskaya et al. (Eds.): Computational Science—ICCS 2020, LNCS 12138, 20th International Conference Proceedings, Part II, Amsterdam, The Netherlands, Jun. 3-5, 2020, pp. 618-631. (Year: 2020).*

Trabelsi et al., "Semantic Labeling Using a Deep Contextualized Language Model", ARXIV ID: 2010.16037, Oct. 29, 2020, pp. 1-11. (Year: 2020).*

Fan et al., "Semantics-aware Dataset Discovery from Data Lakes with Contextualized col. based Representation Learning", ARXIV ID: 2210.01922, Oct. 4, 2022, pp. 1-17. (Year: 2022).*

Chen, Harr et al. "Content Modeling Using Latent Permutations," Journal of Artificial Intelligence Research, vol. 36, Oct. 2009, pp. 129-163, DOI: 10.1613/jair.2830.

Chrupala, Grzegorz. "Normalizing Tweets With Edit Scripts and Recurrent Neural Embeddings," In Proceedings of the 52nd Annual Meeting of the Association For Computational Linguistics, vol. 2: Short Papers, Jun. 2014, pp. 680-686.

Duarte, José Marcio et al. "Deep Analysis of Word Sense Disambiguation Via Semi-Supervised Learning and Neural Word Representations," Information Sciences, vol. 570, Sep. 2021, pp. 278-297, DOI: 10.1016/j.ins.2021.04.006.

Huang, Hongzhao et al. "Leveraging Deep Neural Networks and Knowledge Graphs For Entity Disambiguation," arXiv preprint arXiv:1504.07678v1 [cs.CL], Apr. 28, 2015, (10 pages), available online: https://arxiv.org/pdf/1504.07678.pdf.

Lourentzou, Ismini et al. "Adapting Sequence To Sequence Models For Text Normalization in Social Media," In Proceedings of the international AAAI Conference on Web and Social Media, vol. 13, Jul. 6, 2019, pp. 335-345.

Raiman, Jonathan et al. "DeepType: Multilingual Entity Linking by Neural Type System Evolution," Proceedings of the AAAI Conference on Artificial Intelligence, vol. 32, No. 1, Apr. 27, 2018, pp. 5406-5413, DOI: 10.1609/aaai.v32i1.12008.

Shen, Wei et al. "Entity Linking Meets Deep Learning: Techniques and Solutions," arXiv preprint arXiv:2109.12520v1 [cs.CL], Sep. 26, 2201, pp. 1-20, available online: https://arxiv.org/pdf/2109.12520.pdf.

Sinha, Koustuv et al. "UnNatural Language Inference," arXiv preprint arXiv:2101.00010v2 [cs.CL], Jun. 11, 2021, (18 pages), available online: https://arxiv.org/pdf/2101.00010.pdf.

Vretinaris, Alina et al. "Medical Entity Disambiguation Using Graph Neural Networks," arXiv preprint arXiv:2104.01488v1 [cs.IR], Apr. 3, 2021, (10 pages), available online: https://arxiv.org/pdf/2104.01488.pdf.

Xie, Jie et al. "Joint Entity Linking For Web Tables With Hybrid Semantic Matching," In Computational Science—ICCS 2020: 20th International Conference, Proceedings, Part II 20 2020, Amsterdam, The Netherlands, Jun. 15, 2020, pp. 618-631, DOI: 10.1007/978-3-030-50417-5_46.

Imani, Ehsan, et al., "Representation Alignment in Neural Networks", submitted Sep. 17, 2022 to Cornell University Olin Library Online Archive, available on the Internet at https://arxiv.org/pdf/2112.07806, 26 pages.

Mena, Gonzalo E., et al., Learning Latent Permutation with Gumbel-Sinkhorn Networks, Proceedings of 6th International Conference on Learning Representations 2018, Apr. 30-May 3, 2018, Vancouver BC, Canada, available on the Internet at https://openreview.net/pdf?id=Byt30J-0W, 22 pages.

Non-Final Rejection Mailed on Jan. 22, 2026 for U.S. Appl. No. 18/331,530, 11 page(s).

Notice of Allowance and Fees Due (PTOL-85) Mailed on May 4, 2026 for U.S. Appl. No. 18/331,530, 8 page(s).

* cited by examiner

500

502 504A 504B 504C

| Raw Field Name | Primitive Data Type | Logical Data Type | Medication Administration | Medication | Medication Request |
|---|---|---|---|---|---|
| sig | string | medicationadministration.dosage.dose.value | 1 | -1 | -1 |
| strength | generic | medication.ingredient.strength | -1 | 1 | -1 |
| FORM | string | medication.form | -1 | 1 | -1 |
| ROUTE | string | medicationadministration.dosage.route | 1 | 1 | -1 |
| frequency | string | medicationrequest.disperserequest.dispenseinterval | -1 | -1 | 1 |
| LASTDOSE | string | medicationadministration.status | 1 | 0 | 0 |
| REFILLS | string | medicationrequest.disperserequest.numberofrepeatsallowed | 1 | -1 | 1 |
| NDC_CODE | string | medicationadministraton.identifier.ndc_code | 1 | 1 | -1 |
| rxnorm | integer | medicationadministration.identifier.rx_norm | 1 | -1 | -1 |
| drugname | string | medication.code.text | -1 | 1 | -1 |
| genericname | string | medication.code.text | -1 | 1 | -1 |
| thera_class | string | medicationrequest.courseoftherapytype | -1 | -1 | 1 |
| pharm_class | string | medicationadministration.category.coding.drugclass | 1 | -1 | -1 |

FIG. 5

900

904

| | Patient | Related Person | Organization | Medication | .... | Encounter |
|---|---|---|---|---|---|---|
| name | 0.85 | 0.9 | 0.9 | 0.23 | | 0.02 |
| id | 1 | 1 | 1 | 1 | | 1 |
| gender | 0.78 | 0.56 | 0 | 0 | | 0 |
| active | 0.79 | 0.68 | 0.5 | 0.33 | | 0.45 |
| status | 0.45 | 0.34 | 0.33 | 0.68 | | 0.68 |
| code | 0 | 0 | 0 | 0.9 | | 0.4 |
| date | 0.87 | 0 | 0 | 0.75 | | 0.94 |
| condition | 0 | 0 | 0 | 0.59 | | 0.78 |
| dose | 0 | 0 | 0 | 0.87 | | 0.9 |
| ... | | | | | | |
| relation | 0.67 | 0.98 | 0 | 0 | | 0 |

902

FIG. 9

MACHINE LEARNING TECHNIQUES FOR DISAMBIGUATING UNSTRUCTURED DATA FIELDS FOR MAPPING TO DATA TABLES

BACKGROUND

Various embodiments of the present disclosure address technical challenges related to performing predictive data analysis and provide solutions to address the efficiency and reliability shortcomings of existing predictive data analysis solutions.

BRIEF SUMMARY

In general, various embodiments of the present disclosure provide methods, apparatus, systems, computing devices, computing entities, and/or the like for determining data table-data field relationships of unstructured data.

In some embodiments, a computer-implemented method comprises: generating, by one or more processors, a matrix representation of a common data model, wherein the common data model comprises (i) a plurality of rows associated with a plurality of data tables, and (ii) a plurality of columns associated with a plurality of data fields; determining, by the one or more processors, one or more logical data type weights for respective one or more data table-data field pairs associated with the matrix representation; generating, by the one or more processors, one or more disambiguation embeddings based on the matrix representation and the one or more logical data type weights; generating, by the one or more processors, a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generating, by the one or more processors and using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assigning, by the one or more processors, one or more select data fields associated with the one or more query sets to respective one or more candidate data tables based on the plurality of prediction vectors; and initiating, by the one or more processors, the performance of one or more prediction-based actions based on the assigning.

In some embodiments, a computing apparatus comprising memory and one or more processors communicatively coupled to the memory, the one or more processors configured to: generate a matrix representation of a common data model, wherein the common data model comprises (i) a plurality of rows associated with a plurality of data tables, and (ii) a plurality of columns associated with a plurality of data fields; determine one or more logical data type weights for respective one or more data table-data field pairs associated with the matrix representation; generate one or more disambiguation embeddings based on the matrix representation and the one or more logical data type weights; generate a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generate, using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assign one or more select data fields associated with the one or more query sets to respective one or more candidate data tables based on the plurality of prediction vectors; and initiate the performance of one or more prediction-based actions based on the assignment of the one or more select data fields.

In some embodiments, one or more non-transitory computer-readable storage media including instructions that, when executed by one or more processors, cause the one or more processors to: generate a matrix representation of a common data model, wherein the common data model comprises (i) a plurality of rows associated with a plurality of data tables, and (ii) a plurality of columns associated with a plurality of data fields; determine one or more logical data type weights for respective one or more data table-data field pairs associated with the matrix representation; generate one or more disambiguation embeddings based on the matrix representation and the one or more logical data type weights; generate a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generate, using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assign one or more select data fields associated with the one or more query sets to respective one or more candidate data tables based on the plurality of prediction vectors; and initiate the performance of one or more prediction-based actions based on the assignment of the one or more select data fields.

BRIEF DESCRIPTION OF THE DRAWINGS

FIG. 5 depicts an operational example of prediction inputs in accordance with some embodiments discussed herein.

FIG. 9 depicts an operational example of disambiguation embeddings in accordance with some embodiments discussed herein.

DETAILED DESCRIPTION

Figure 1:
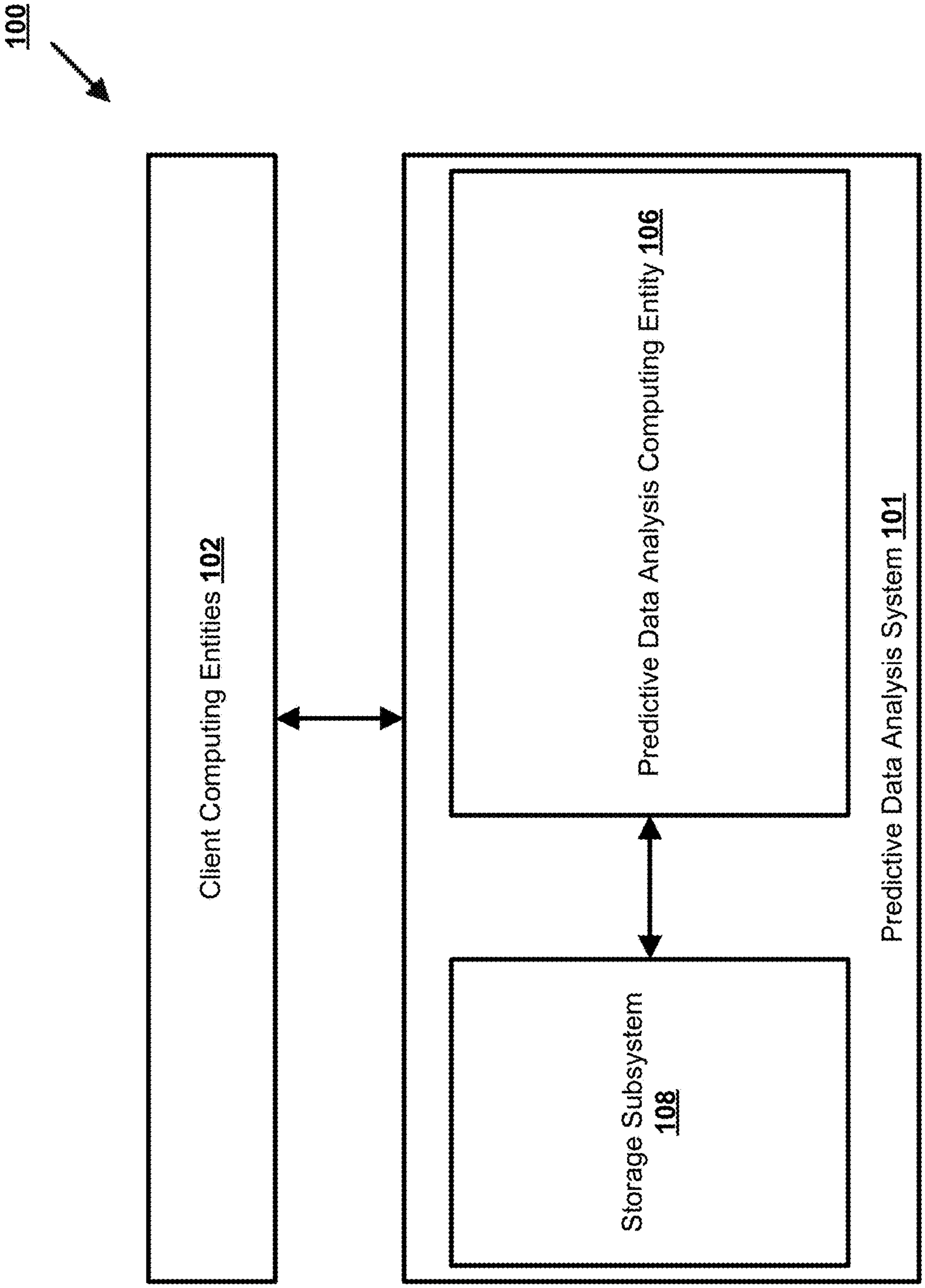
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically initiate performance of prediction-based actions based on the generated predictions.

An example of a prediction-based action that can be performed using the predictive data analysis system 101 comprises receiving a request for disambiguating a data field associated with unstructured data to one of a plurality of candidate data tables, predicting probabilities of the data field belonging to the plurality of candidate data tables, assigning the data field to one of the plurality of candidate data tables based on the probabilities, and displaying the assignment on a user interface. Other examples of prediction-based actions comprise generating a diagnostic report, displaying/providing resources, formatting data, generating and/or executing action scripts, generating alerts or electronic communications.

In accordance with various embodiments of the present disclosure, a predictive machine learning model may be trained to predict an association of a data field of unstructured data to one of a plurality of candidate data tables. The plurality of candidate data tables may comprise data tables of which the data field may be potentially mapped to and standardized according to a common data model. Accordingly, the disclosed predictive machine learning model may be trained with disambiguation embeddings based on the common data model and logical data type characteristics associated with the common data model. Feedback data associated with prediction output generated by the disclosed predictive machine learning model may be used to re-train weights relevant to the feedback data. This technique will lead to higher accuracy of performing data standardization operations. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically initiate performance of prediction-based actions based on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FORAM, NVRAM, MRAM, RRAM, SONOS, FJG RAM, Millipede memory, racetrack memory, and/or the like.

A. Example Predictive Data Analysis Computing Entity

Figure 2:
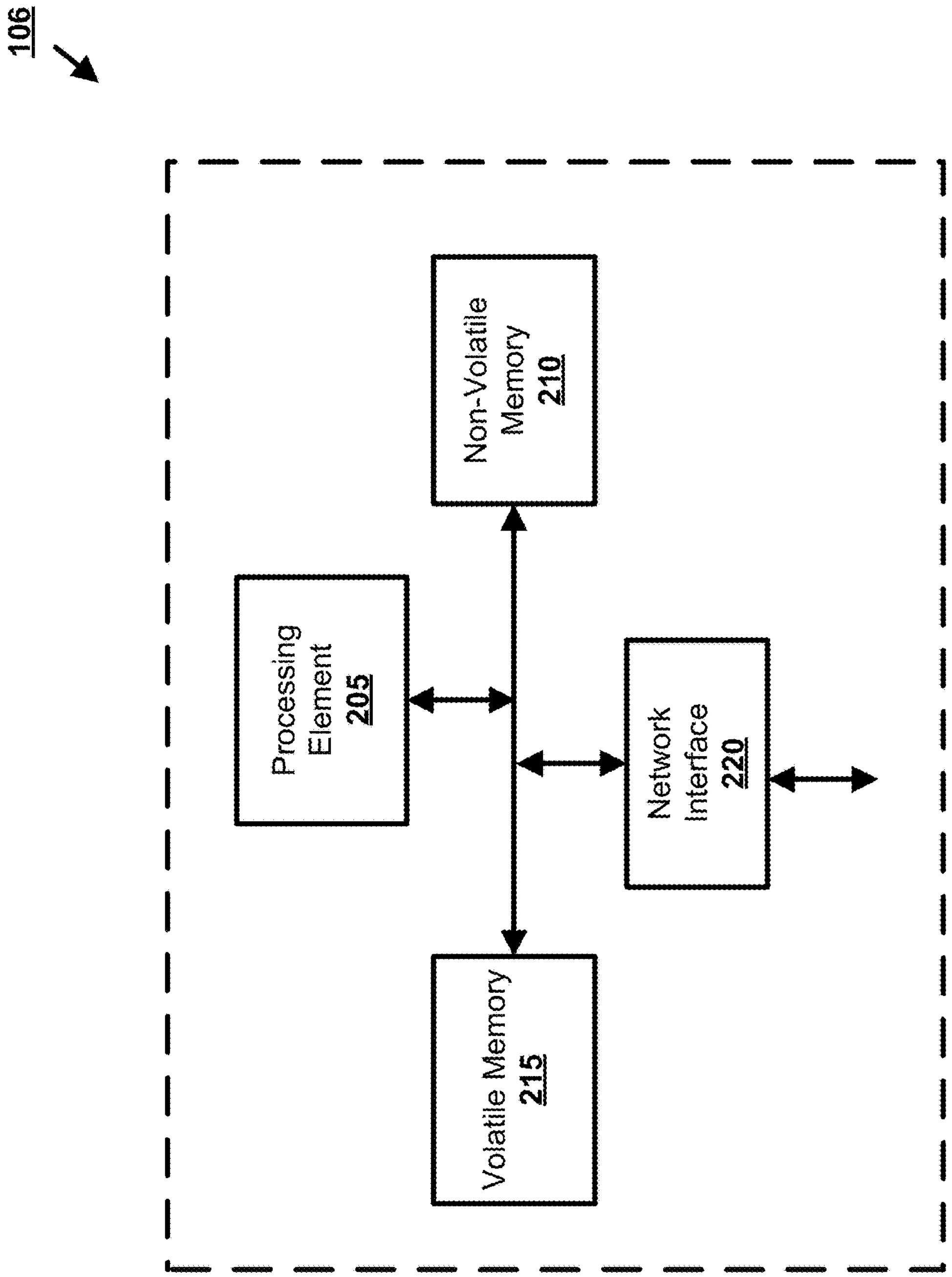
FIG. 2 provides an example predictive data analysis computing entity in accordance with some embodiments of the present disclosure.

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As indicated, in some embodiments, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs. SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 may further include, or be in communication with, volatile media (also referred to as volatile storage, memory, memory storage, memory circuitry and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Wireless Local Area Network (WLAN, e.g., Wi-Fi™), IEEE 802.11 (Wi-Fi™), Wi-Fi™ Direct, Wireless Metropolitan Area Network (WMAN, e.g., WiMAX®, 802.16 (WiMAX®), ultra-wideband (UWB), infrared (IR) protocols, near field communication (NFC) protocols, Wibree, Wireless Personal Area Network (WPAN, e.g., Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 3:
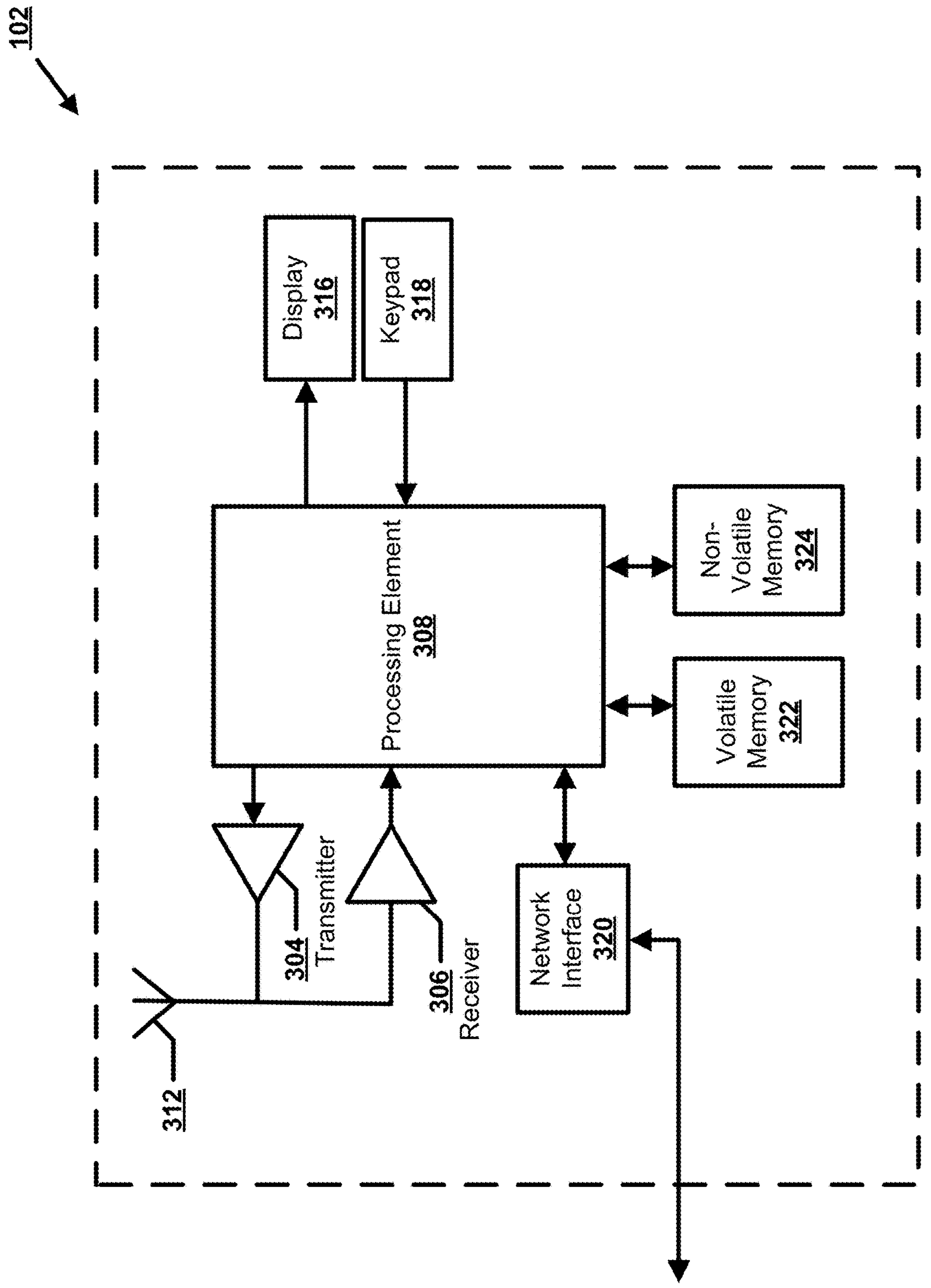
FIG. 3 provides an example client computing entity in accordance with some embodiments of the present disclosure.

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In some embodiments, the client computing entity 102 may operate in accordance with multiple wireless communication standards and protocols, such as UMTS, CDMA2000, 1×RTT, WCDMA, GSM, EDGE, TDSCDMA, LTE, E-UTRAN, EVDO, HSPA, HSDPA, Wi-Fi™, Wi-Fi™ Direct, WiMAX®, UWB, IR, NFC, Bluetooth®, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client computing entity 102 in connection with a variety of other systems, including cellular towers, Wi-Fi™ access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi™ access points, cellular towers, nearby computing devices (e.g., smartphones, laptops) and/or the like. For instance, such technologies may include the iBeacons, Gimbal proximity beacons, Bluetooth® Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FORAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the client computing entity 102 or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "common data model" may refer to a data construct that describes a standardization of data elements and how the data elements relate to one another to allow for data and information exchange between different applications and data sources. For example, a common data model may organize and/or format unstructured data or data from many sources that are in different formats into a standard structure. According to various embodiments of the present disclosure, a common data model may comprise a plurality of data tables and a plurality of data fields associated with respective ones of the plurality of data tables. For example, a common data model may comprise a plurality of data fields that are labeled, assigned, and/or mapped to one or more data tables.

In some embodiments, the term "matrix representation" may refer to a data construct that describes an array of data identifiers comprising a plurality of rows and columns. According to various embodiments of the present disclosure, a matrix representation of a common data model may comprise (i) a plurality of rows that respectively corresponds to a plurality of data tables, and (ii) a plurality of columns that corresponds to respective data fields of the plurality of data tables. As such, the number of rows of a matrix representation may be equal to an amount of the plurality of data tables and the number of columns of the matrix representation may be equal to an amount of the respective data fields of the plurality of data tables.

In some embodiments, the term "data table" may refer to a data construct that describes an arrangement of data comprising one or more records and one or more data fields associated with the one or more records.

In some embodiments, the term "data field" may refer to a data construct that describes an attribute, property, or parameter associated with one or more records of a data table.

In some embodiments, the term "logical data type weight" may refer to a data construct that describes an importance of a logical data type in a data table. The logical data type weight may comprise a numerical score that may be associated with a data table-data field pair within a matrix representation of a common data model. According to some embodiments, a logical data type weight may be determined based on one or more mutual information scores between a logical data type and a plurality of data tables, frequency of a logical data type with respect to the plurality of data tables, and a rarity score of a logical data type with respect to the plurality of data tables.

In some embodiments, the term "table-column relationship" may refer to a data construct that describes a rarity associated with a logical data type with respect to the plurality of data tables.

In some embodiments, the term "data table-data field pair" may refer to a data construct that describes a data field of a data table. For example, a data table-data field pair may identify a data field of a data table from a matrix representation of a common data model.

In some embodiments, the term "disambiguation embedding" may refer to a data construct that describes a representation of an attribute associated with a data element (e.g., a data field). A disambiguation embedding may comprise a numerical value associated with a qualitative attribute associated with a data element. For example, a disambiguation embedding may comprise a value based on a logical data type weight and/or a table-column relationship associated with a data element.

In some embodiments, the term "embedding vector" may refer to a data construct that describes a latent representation of a data object, such as a data table. Embedding vectors may be generated for prediction inputs and training data such that the prediction inputs and training data can be presented in a format suitable for analysis by a machine learning model, such as a disambiguation machine learning model. According to some embodiments, an embedding vector may be generated based on one or more disambiguation embeddings. For example, an embedding vector may be generated for a data table comprising one or more data fields based on one or more disambiguation embeddings associated with the one or more data fields.

In some embodiments, the term "prediction input" may refer to a data construct that describes features that may be provided to a disambiguation machine learning model for analysis to generate a prediction output. According to some embodiments, a prediction input may comprise incomplete mappings of data fields to a plurality of candidate data tables based on a common data model or a neural network machine learning model trained on a common data model. The incomplete mappings may be presented to a disambiguation machine learning model as one or more prediction inputs comprising one or more query sets, where a query set may comprise a plurality of candidate data tables (selected from a plurality of data tables from, e.g., a common data model) and a select data field (e.g., ambiguously mapped to the candidate data tables). A disambiguation machine learning model may be used to generate a prediction vector based on prediction input (e.g., in the form of one or more embedding vectors) to disambiguate select data fields to specific ones of a plurality of candidate data tables.

In some embodiments, the term "prediction vector" may refer to a data construct that describes an output of a machine learning model, such as a disambiguation machine learning model. A machine learning model may be trained to generate one or more prediction vectors based on a prediction input. According to some embodiments, a prediction vector may comprise a plurality of probability scores associated with a particular data field matching to respective ones of a plurality of data tables. For example, a disambiguation machine learning model may apply a function to generate probability scores, such as Softmax or any other function capable of converting output generated by the disambiguation machine learning model to vectors of probability. As such, the plurality of probability scores of one or more prediction vectors may be used to disambiguate the particular data field to one of a plurality of candidate data tables.

In some embodiments, the term "data standardization machine learning model framework" may refer to a data construct that describes parameters, hyperparameters, and/or defined operations of a machine learning model that is configured to generate a matrix representation of a common data model, determine one or more logical data type weights for respective one or more data table-data field pairs associated with the matrix representation, generate one or more disambiguation embeddings based on the matrix representation and the one or more logical data type weights, generate a plurality of input embedding vectors for one or more prediction inputs based on the one or more disambiguation embeddings, generate, using a disambiguation machine learning model, a plurality of prediction vectors based on the plurality of input embedding vectors, assign one or more select data fields associated with the one or more prediction inputs to respective one or more candidate data tables based on the plurality of prediction vectors, and initiate the performance of one or more prediction-based actions based on the assignment of the one or more select data fields.

In some embodiments, the term "disambiguation machine learning model" may refer to a data construct that describes parameters, hyperparameters, and/or defined operations of a machine learning model that is configured to generate a plurality of prediction vectors for one or more prediction inputs based on embedding vectors of the one or more prediction inputs. According to some embodiments, the disambiguation machine learning model may be trained with one or more training embedding vectors associated with a training dataset. The training dataset may comprise an association of one or more training data fields with one or more respective training data tables. The one or more training embedding vectors may be generated based on one or more disambiguation embeddings generated for the training dataset.

In some embodiments, the term "feedback data" may refer to a data construct that describes training data comprising one or more refinements to data field to candidate data table assignments made by a data standardization machine learning model framework. Feedback data may be provided by, for example, a user, such as a subject matter expert or auditor. In some embodiments, feedback data may comprise a confirmation or change to an assignment of one or more select data fields to respective one or more candidate tables made by a data standardization machine learning model framework. As such, feedback data may be used to re-train a machine learning model (e.g., disambiguation machine learning model) used by the data standardization machine learning model framework. According to some embodiments, re-training the machine learning model may comprise re-initiating one or more weights of the machine learning model based on the feedback data.

IV. OVERVIEW, TECHNICAL IMPROVEMENTS, AND TECHNICAL ADVANTAGES

Various embodiments of the present disclosure make important technical contributions to improving predictive accuracy of predictive machine learning models used to resolve data fields to data tables by training the predictive machine learning models with embeddings representative of common data models and logical data type characteristics associated with the common data models. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

For example, various embodiments of the present disclosure improve predictive accuracy of predictive machine learning models by training the predictive machine learning models with embeddings representative of common data models and logical data type characteristics associated with the common data models. As described herein, common data models may be used to standardize disparate data received from a plurality of data sources such that data organized in tabular structures comprising rows and columns (e.g., data tables) may be parsed into a form usable by a particular application or system. However, data formats with different inconsistent metadata may impede the parsing of the disparate data into usable datasets. In particular, common data models may fail when there are ambiguous scenarios where a single data field in a data source is mapped to multiple data tables of the common data models.

However, in accordance with various embodiments of the present disclosure, a predictive machine learning model may be trained to predict an association of a data field of unstructured data to one of a plurality of candidate data tables. The plurality of candidate data tables may comprise data tables of which the data field may be potentially mapped to and standardized according to a common data model. Accordingly, the predictive machine learning model may be trained with disambiguation embeddings based on the common data model and logical data type characteristics associated with the common data model. Feedback data associated with prediction output generated by the disclosed predictive machine learning model may be used to re-train weights relevant to the feedback data. This technique will lead to higher accuracy of performing data standardization operations. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

V. EXAMPLE SYSTEM OPERATIONS

As indicated, various embodiments of the present disclosure make important technical contributions to improving predictive accuracy of predictive machine learning models used to resolve data fields to data tables by training the predictive machine learning models with embeddings representative of common data models and logical data type characteristics associated with the common data models. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

Figure 4:
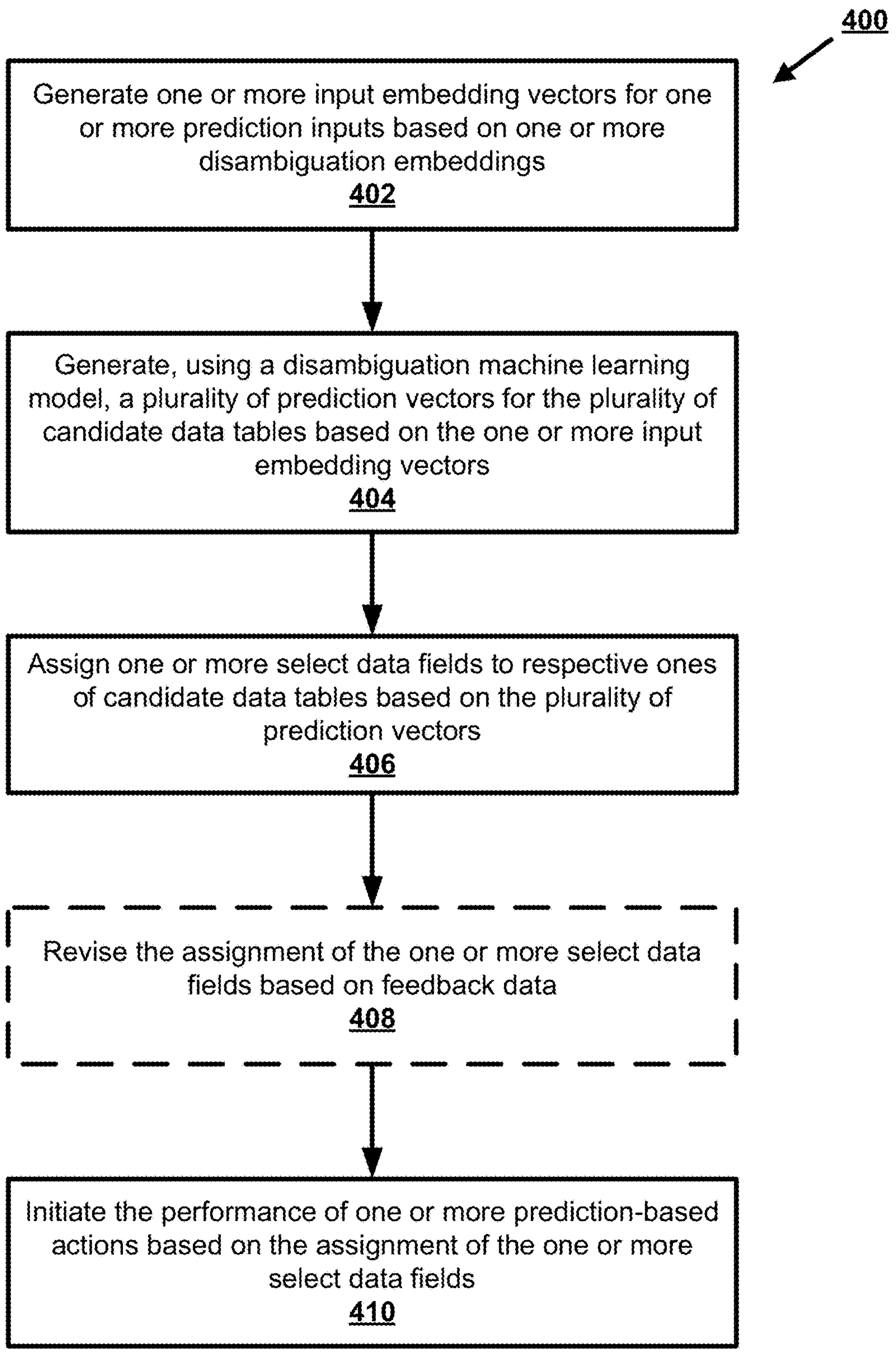
FIG. 4 is a flowchart diagram of an example process for performing predictive operations on one or more prediction inputs in accordance with some embodiments of the present disclosure.

FIG. 4 is a flowchart diagram of an example process 400 for performing predictive operations on one or more prediction inputs comprising one or more query sets, where a query set may comprise a plurality of candidate data tables and a select data field. In some embodiments, via the various steps/operations of the process 400, the predictive data analysis computing entity 106 can use a data standardization machine learning model framework to generate input embedding vectors for the one or more prediction inputs and use the input embedding vectors to generate a plurality of prediction vectors for matching select data fields to specific candidate data tables. In some embodiments, a data table describes an arrangement of data comprising one or more records and one or more data fields associated with the one or more records. In some embodiments, a data field describes an attribute, property, or parameter associated with one or more records of a data table.

In some embodiments, the process 400 begins at step/operation 402 when the predictive data analysis computing entity 106 generates a plurality of input embedding vectors for one or more prediction inputs based on one or more disambiguation embeddings. In some embodiments, a prediction input describes features that may be provided to a disambiguation machine learning model for analysis to generate a prediction output. As an example, a prediction input may comprise incomplete mappings of data fields to a plurality of candidate data tables based on a common data model or a neural network machine learning model trained on a common data model. The incomplete mappings may be presented to a disambiguation machine learning model as one or more prediction inputs comprising one or more query sets, where a query set may comprise a plurality of candidate data tables and a select data field. The plurality of candidate data tables may be selected from a plurality of data tables, e.g., based on a common data model, and the select data field may comprise a data field determined as uncertain (or ambiguous) as to which of the plurality of candidate data tables the select data field is associated with, e.g., based on the common data model. Accordingly, a disambiguation machine learning model may be used to generate a prediction vector based on prediction input (e.g., in the form of one or more embedding vectors) to disambiguate select data fields to specific ones of a plurality of candidate data tables.

As depicted in FIG. 5, in some embodiments, an operational example of prediction inputs 500 comprising a plurality of ambiguous data fields 502 and data tables 504A (Medication Administration), 504B (Medication), and 504C (Medication Request). As depicted in FIG. 5, a value of “1” under the data table columns indicates a match, while a value of “0” indicates a match not found, and a value of “−1” indicates that a data field is not applicable to a particular data table. Ideally, each of data fields 502 are matched to one of data tables 504A, 504B, or 504C by e.g., a common data model. However, instances where particular ones of data fields 502 that are matched to more than one of data tables 504A, 504B, or 504C may be provided as prediction inputs to a disambiguation machine learning model to resolve each of such particular data fields to one of data tables 504A, 504B, or 504C. As an example, a first prediction input may comprise a query set comprising a “ROUTE” data field mapped to candidate tables 504A and 504B (Medication), a second prediction input may comprise a query set comprising a “REFILLS” data field mapped to candidate tables 504A and 504C, and a third prediction input may comprise a query set comprising a “NDC CODE” data field mapped to candidate tables 504A and 504B.

In some embodiments, an embedding vector describes a latent representation of a data object, such as a data table. Embedding vectors may be generated for prediction inputs such that the prediction inputs can be presented in a format suitable for analysis by a machine learning model, such as a disambiguation machine learning model. According to some embodiments, a prediction input, comprising a plurality of candidate data tables and a select data field, may be represented as embedding vectors by generating a plurality of input embedding vectors, that is, an input embedding vector for each of the plurality of candidate data tables, such that each of the plurality of input embedding vectors is associated with a given one of the plurality of candidate data tables and the select data field. Embedding vectors may be generated based on one or more disambiguation embeddings. For example, an embedding vector may be generated for a data table comprising one or more data fields based on one or more disambiguation embeddings associated with the one or more data fields.

In some embodiments, a disambiguation embedding describes a representation of an attribute associated with a data element (e.g., a data field). A disambiguation embedding may comprise a numerical value associated with a qualitative attribute associated with a data element. For example, a disambiguation embedding may comprise a value based on a logical data type weight and/or a table-column relationship associated with a data element.

In some embodiments, a logical data type weight describes an importance of a logical data type in a data table. According to some embodiments, a logical data type weight may be determined based on one or more mutual information scores between a logical data type and a plurality of data tables, frequency of a logical data type with respect to the plurality of data tables, and a rarity score of a logical data type with respect to the plurality of data tables.

In some embodiments, a table-column relationship may refer to a data construct that describes a rarity associated with a logical data type with respect to the plurality of data tables. For example, a rarity score may be determined by $$\log\left(\frac{N}{DTF_x + 1}\right),$$

comprising a percentage of N total number of tables in a common data model over $DTF_x$ number of data tables (e.g., of a plurality of data tables) containing the logical data type. According to various embodiments, a common data model graph may be generated based on a matrix representation of a common data model and table-column relationships. The common data model graph may comprise data table and data fields as vertices and edges between the vertices may comprise connection weights based on the table-column relationships. In some embodiments, the common data model graph may be used to generate disambiguation embeddings for data fields associated with data tables.

However, as described herein, in accordance with various embodiments of the present disclosure, a predictive machine learning model may be trained to predict an association of a data field of unstructured data to one of a plurality of candidate data tables. The plurality of candidate data tables may comprise data tables of which the data field may be potentially mapped to and standardized according to a common data model. Accordingly, the predictive machine learning model may be trained with disambiguation embeddings based on the common data model and logical data type characteristics associated with the common data model. Feedback data associated with prediction output generated by the disclosed predictive machine learning model may be used to re-train weights relevant to the feedback data. This technique will lead to higher accuracy of performing data standardization operations. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

Returning to FIG. 4, in some embodiments, at step/operation 404, the predictive data analysis computing entity 106 generates, using a disambiguation machine learning model, a plurality of prediction vectors based on the plurality of input embedding vectors.

In some embodiments, a prediction vector describes an output of a machine learning model, such as a disambiguation machine learning model. According to some embodiments, a prediction vector may comprise a plurality of probability scores associated with a particular data field matching to respective ones of a plurality of data tables. For example, a disambiguation machine learning model may apply a function to generate probability scores, such as Softmax or any other function capable of converting output generated by the disambiguation machine learning model to vectors of probability. As such, the plurality of probability scores of one or more prediction vectors may be used to disambiguate the particular data field to one of a plurality of candidate data tables.

Figure 6:
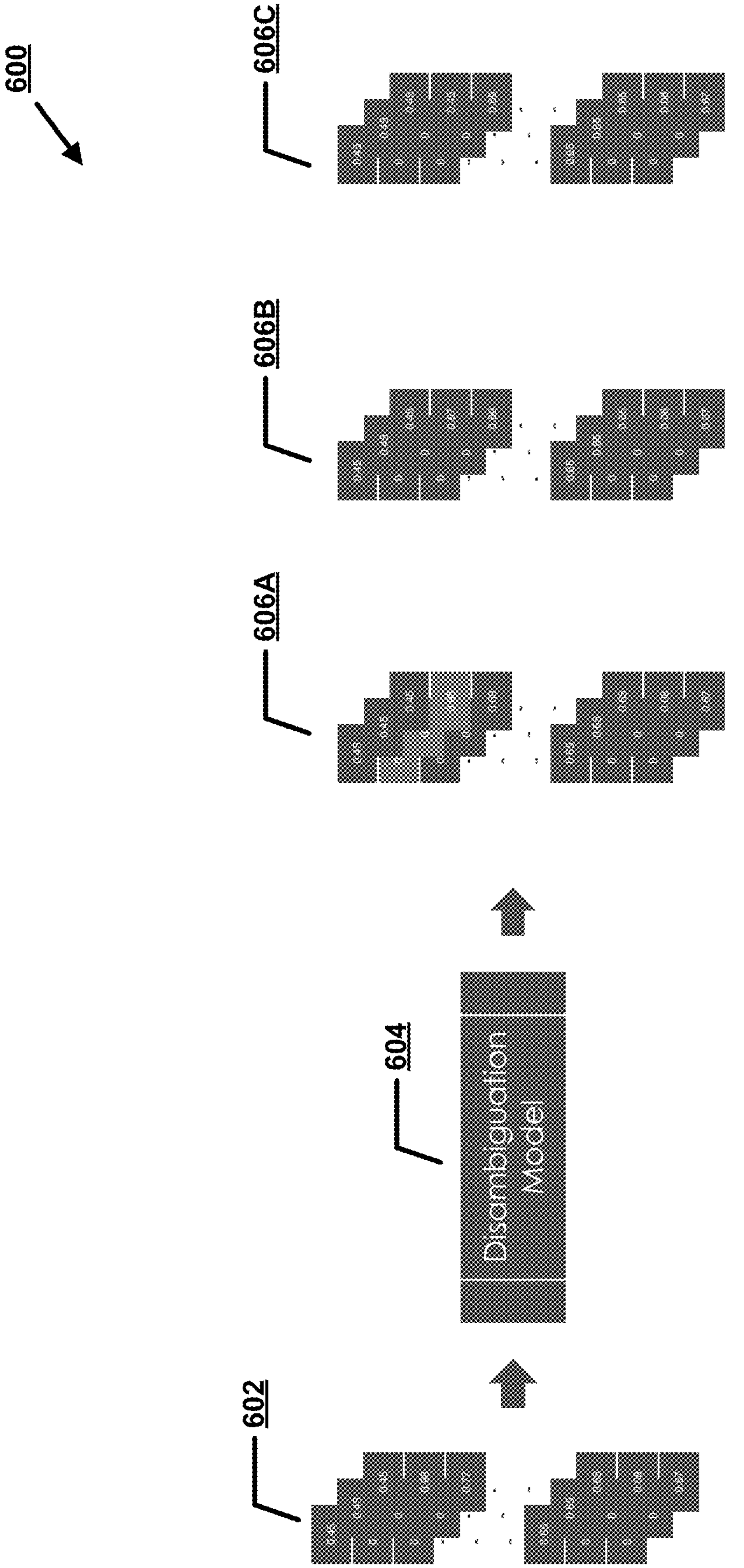
FIG. 6 depicts data standardization machine learning model framework in accordance with some embodiments discussed herein.

In some embodiments, a data standardization machine learning model framework 600 is depicted in FIG. 6. As further depicted in FIG. 6, the data standardization machine learning model framework 600 comprises a disambiguation model 604 receiving one or more prediction inputs comprising a plurality of input embedding vectors 602. The disambiguation model 604 may in turn generate a plurality of prediction vectors 606A, 606B, and 606C. Each of the plurality of prediction vectors 606A, 606B, and 606C may be associated with a specific one of a plurality of candidate data tables.

In some embodiments, a disambiguation machine learning model may be trained with one or more training embedding vectors associated with a training dataset. Embedding vectors may be generated for training data such that the training data can be presented in a format suitable for analysis by a machine learning model, such as a disambiguation machine learning model. The training dataset may comprise an association of one or more training data fields with one or more respective training data tables. The one or more training embedding vectors may be generated based on one or more disambiguation embeddings generated for the training dataset.

Returning to FIG. 4, in some embodiments, at step/operation 406, the predictive data analysis computing entity 106 assigns one or more select data fields associated with the one or more query sets to respective one or more candidate data tables based on the plurality of prediction vectors. That is, for each query set, a select data field may be assigned to a specific one of a plurality of candidate tables.

In some embodiments, at optional step/operation 408, the predictive data analysis computing entity 106 revises the assignment of the one or more select data fields based on feedback data. In some embodiments, feedback data describes training data comprising one or more refinements to data field to candidate data table assignments made by a data standardization machine learning model framework. Feedback data may be provided by, for example, a user, such as a subject matter expert or auditor. In some embodiments, feedback data may comprise a confirmation or change to an assignment of one or more select data fields to respective one or more candidate tables made by a data standardization machine learning model framework. As such, feedback data may be used to re-train a machine learning model (e.g., disambiguation machine learning model) used by the data standardization machine learning model framework. According to some embodiments, re-training the machine learning model may comprise re-initiating one or more weights of the machine learning model based on the feedback data.

In some embodiments, at step/operation 410, the predictive data analysis computing entity 106 initiates the performance of one or more prediction-based actions based on the assignment of the one or more select data fields. Initiating the performance of the one or more prediction-based actions based on the assignment of the one or more select data fields comprises, for example, performing a resource-based action (e.g., allocation of resource), generating a diagnostic report, formatting data, generating and/or executing action scripts, generating alerts or messages, or generating one or more electronic communications. The one or more prediction-based actions may further include displaying visual renderings of the aforementioned examples of prediction-based actions in addition to values, charts, and representations associated with the optimum operation configuration using a prediction output user interface.

Figure 7:
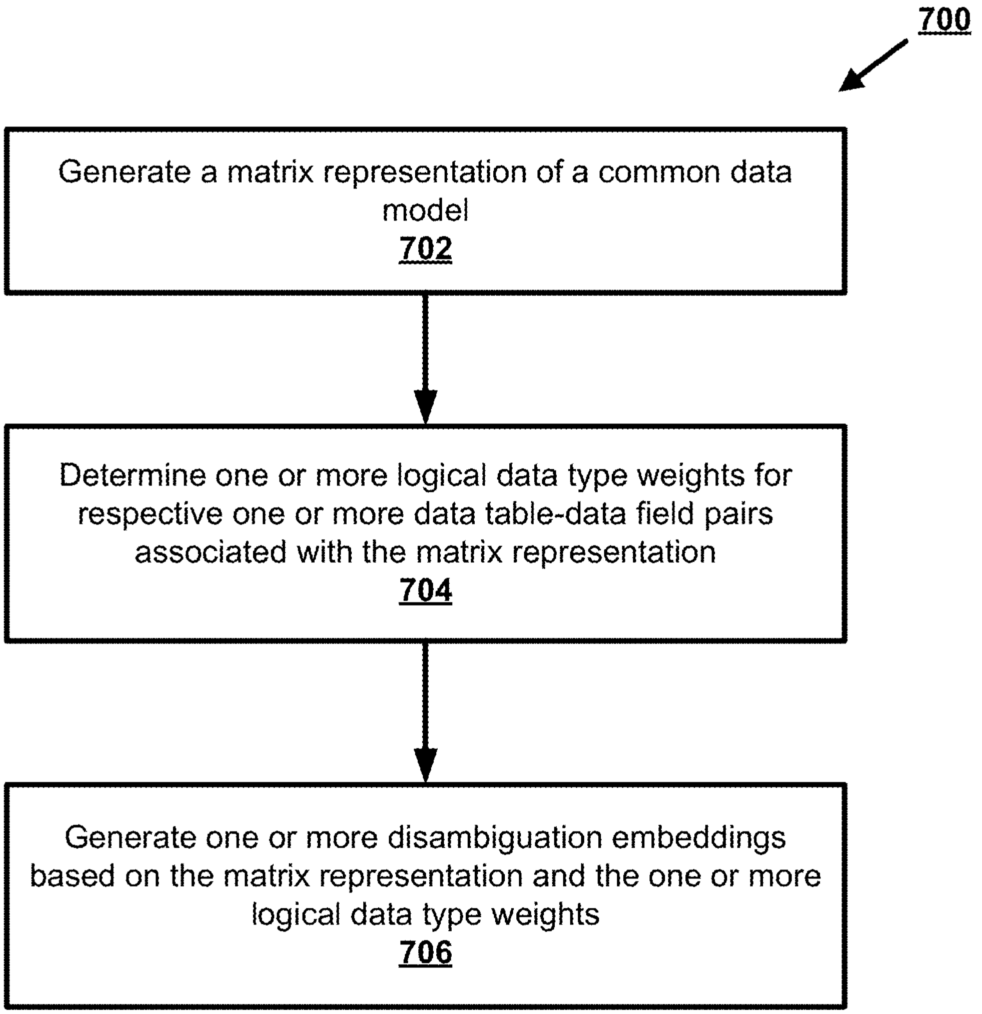
FIG. 7 is a flowchart diagram of an example process for extracting disambiguating features of data fields associated with a common data model in accordance with some embodiments of the present disclosure.

FIG. 7 is a flowchart diagram of an example process 700 for extracting disambiguating features of data fields associated with a common data model.

In some embodiments, the process 700 begins at step/operation 702 when the predictive data analysis computing entity 106 generates a matrix representation of a common data model.

In some embodiments, a common data model describes a standardization of data elements and how the data elements relate to one another to allow for data and information exchange between different applications and data sources. For example, a common data model may organize and/or format unstructured data or data from many sources that are in different formats into a standard structure. According to various embodiments of the present disclosure, a common data model may comprise a plurality of data tables and a plurality of data fields associated with respective ones of the plurality of data tables. For example, a common data model may comprise a plurality of data fields that are labeled, assigned, and/or mapped to one or more data tables.

Figure 8:
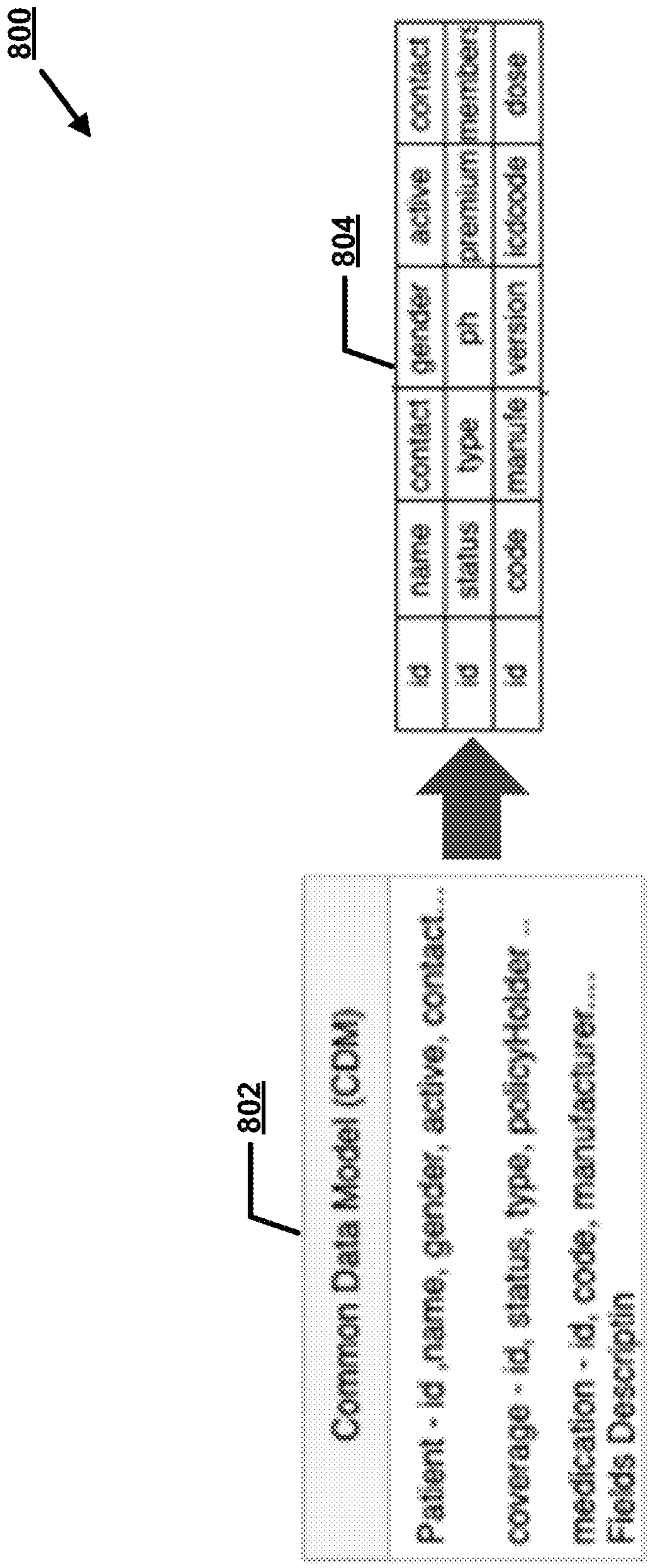
FIG. 8 depicts an operational example of a matrix representation of a common data model in accordance with some embodiments discussed herein.

In some embodiments, a matrix representation describes an array of data identifiers comprising a plurality of rows and columns. According to various embodiments of the present disclosure, a matrix representation of a common data model may comprise (i) a plurality of rows that respectively corresponds to a plurality of data tables, and (ii) a plurality of columns that corresponds to respective data fields of the plurality of data tables. As such, the number of rows of a matrix representation may be equal to an amount of the plurality of data tables and the number of columns of the matrix representation may be equal to an amount of the respective data fields of the plurality of data tables. In some embodiments, an operational example of a matrix representation 804 of a common data model 802 is depicted in FIG. 8.

Returning to FIG. 7, in some embodiments, at step/operation 704, the predictive data analysis computing entity 106 determines one or more logical data type weights for respective one or more data table-data field pairs associated with the matrix representation. In some embodiments, a data table-data field pair describes a data field of a data table. For example, a data table-data field pair may identify a data field of a data table from a matrix representation of a common data model.

According to various embodiments of the present disclosure, a logical data type weight may comprise a normalized logical data type weight $W_{x,y}$, which may be determined according to the following:

$$W_{x,y} = \sum_{k=0}^{n} (B_{x,k} * CF_{x,y}) * \log\left(\frac{N}{DTF_x + 1}\right) \quad \text{Equation 1}$$

In the above equation, x may represent a logical data type of a data field and y may represent a data table. $CF_{x,y}$ may represent a frequency of a logical data type x in a data table y. $B_{x,k}$ may represent a normalization score of logical data type x for each k data table, which may comprise a mutual information score. A rarity of a logical data type, for example within a common data model, may be represented as $$\log\left(\frac{N}{DTF_x + 1}\right),$$

including a percentage of N total number of tables in the common data model over $DTF_x$ number of data tables (e.g., of a plurality of data tables) containing the logical data type.

In some embodiments, at step/operation 706, the predictive data analysis computing entity 106 generates one or more disambiguation embeddings based on the matrix representation and the one or more logical data type weights. In some embodiments, an operational example of a disambiguation embeddings 900 is depicted in FIG. 9. As further depicted in FIG. 9, disambiguation embeddings 900 comprises logical data type weights of data fields 902 in data tables 904.

Accordingly, as described above, various embodiments of the present disclosure make important technical contributions to improving predictive accuracy of predictive machine learning models used to resolve data fields to data tables by training the predictive machine learning models with embeddings representative of common data models and logical data type characteristics associated with the common data models. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method comprising: generating, by one or more processors, a matrix representation of a common data model, wherein the common data model comprises (i) a plurality of rows associated with a plurality of data tables, and (ii) a plurality of columns associated with a plurality of data fields; determining, by the one or more processors, one or more logical data type weights for respective one or more data table-data field pairs associated with the matrix representation; generating, by the one or more processors, one or more disambiguation embeddings based on the matrix representation and the one or more logical data type weights; generating, by the one or more processors, a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generating, by the one or more processors and using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assigning, by the one or more processors, one or more select data fields associated with the one or more query sets to respective one or more candidate data tables based on the plurality of prediction vectors; and initiating, by the one or more processors, the performance of one or more prediction-based actions based on the assigning.

Example 2. The computer-implemented method of any of the preceding examples, wherein the disambiguation machine learning model comprises a neural network machine learning network.

Example 3. The computer-implemented method of any of the preceding examples further comprising: generating, by the one or more processors, one or more training embedding vectors for a training dataset based on the one or more disambiguation embeddings and one or more table-column relationship embeddings; and training, by the one or more processors, the disambiguation machine learning model based on the one or more training embedding vectors.

Example 4. The computer-implemented method of any of the preceding examples, wherein the one or more table-column relationship embeddings are based on one or more rarity scores associated with one or more logical data types with respect to the plurality of data tables.

Example 5. The computer-implemented method of any of the preceding examples, wherein the one or more logical data type weights are based on one or more mutual information scores between logical data type and data table, a frequency of one or more logical data types with respect to the plurality of data tables, and one or more rarity scores of a logical data type with respect to the plurality of data tables.

Example 6. The computer-implemented method of any of the preceding examples, further comprising: receiving, by the one or more processors, feedback data associated with the assigning; and re-training, by the one or more processors, the disambiguation machine learning model based on the feedback data.

Example 7. The computer-implemented method of any of the preceding examples, wherein re-training the disambiguation machine learning model based on the feedback data further comprises re-initiating one or more weights based on the feedback data.

Example 8. A computing apparatus comprising memory and one or more processors communicatively coupled to the memory, the one or more processors configured to: generate a matrix representation of a common data model, wherein the common data model comprises (i) a plurality of rows associated with a plurality of data tables, and (ii) a plurality of columns associated with a plurality of data fields; determine one or more logical data type weights for respective one or more data table-data field pairs associated with the matrix representation; generate one or more disambiguation embeddings based on the matrix representation and the one or more logical data type weights; generate a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generate, using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assign one or more select data fields associated with the one or more query sets to respective one or more candidate data tables based on the plurality of prediction vectors; and initiate the performance of one or more prediction-based actions based on the assignment of the one or more select data fields.

Example 9. The computing apparatus of any of the preceding examples, wherein the disambiguation machine learning model comprises a neural network machine learning network.

Example 10. The computing apparatus of any of the preceding examples, wherein the one or more processors are further configured to: generate one or more training embedding vectors for a training dataset based on the one or more disambiguation embeddings and one or more table-column relationship embeddings; and train the disambiguation machine learning model based on the one or more training embedding vectors.

Example 11. The computing apparatus of any of the preceding examples, wherein the one or more table-column relationship embeddings are based on one or more rarity scores associated with one or more logical data types with respect to the plurality of data tables.

Example 12. The computing apparatus of any of the preceding examples, wherein the one or more logical data type weights are based on one or more mutual information scores between logical data type and data table, a frequency of one or more logical data types with respect to the plurality of data tables, and one or more rarity scores of a logical data type with respect to the plurality of data tables.

Example 13. The computing apparatus of any of the preceding examples, wherein the one or more processors are further configured to: receive feedback data associated with the assigning; and re-train the disambiguation machine learning model based on the feedback data.

Example 14. The computing apparatus of any of the preceding examples, wherein the one or more processors are further configured to re-train the disambiguation machine learning model by re-initiating one or more weights based on the feedback data.

Example 15. One or more non-transitory computer-readable storage media including instructions that, when executed by one or more processors, cause the one or more processors to: generate a matrix representation of a common data model, wherein the common data model comprises (i) a plurality of rows associated with a plurality of data tables, and (ii) a plurality of columns associated with a plurality of data fields; determine one or more logical data type weights for respective one or more data table-data field pairs associated with the matrix representation; generate one or more disambiguation embeddings based on the matrix representation and the one or more logical data type weights; generate a plurality of input embedding vectors for one or more prediction inputs based on the one or more disambiguation embeddings, wherein the one or more prediction inputs comprise one or more query sets, and wherein one query set of the one or more query sets comprises (i) a plurality of candidate data tables selected from the plurality of data tables, and (ii) a select one of the plurality of data fields; generate, using a disambiguation machine learning model, a plurality of prediction vectors based on the plurality of input embedding vectors, wherein (i) one of the plurality of prediction vectors comprises a plurality of probability scores associated with a select data field matching to respective ones of the plurality of data tables, and (ii) one of the plurality of probability scores is associated with one of the plurality of candidate data tables; assign one or more select data fields associated with the one or more query sets to respective one or more candidate data tables based on the plurality of prediction vectors; and initiate the performance of one or more prediction-based actions based on the assignment of the one or more select data fields.

Example 16. The one or more non-transitory computer-readable storage media of any of the preceding examples, wherein the disambiguation machine learning model comprises a neural network machine learning network.

Example 17. The one or more non-transitory computer-readable storage media of any of the preceding examples, further including instructions that, when executed by the one or more processors, cause the one or more processors to: generate one or more training embedding vectors for a training dataset based on the one or more disambiguation embeddings and one or more table-column relationship embeddings; and train the disambiguation machine learning model based on the one or more training embedding vectors.

Example 18. The one or more non-transitory computer-readable storage media of any of the preceding examples, wherein the one or more table-column relationship embeddings are based on one or more rarity scores associated with one or more logical data types with respect to the plurality of data tables.

Example 19. The one or more non-transitory computer-readable storage media of any of the preceding examples, wherein the one or more logical data type weights are based on one or more mutual information scores between logical data type and data table, a frequency of one or more logical data types with respect to the plurality of data tables, and one or more rarity scores of a logical data type with respect to the plurality of data tables.

Example 20. The one or more non-transitory computer-readable storage media of any of the preceding examples, further including instructions that, when executed by the one or more processors, cause the one or more processors to: receive feedback data associated with the assigning; and re-train the disambiguation machine learning model based on the feedback data.

Example 21. The one or more non-transitory computer-readable storage media of any of the preceding examples, wherein the one or more processors are further configured to re-train the disambiguation machine learning model by re-initiating one or more weights based on the feedback data.

The invention claimed is:

1. A computer-implemented method comprising:

generating, by one or more processors, a matrix representation of a common data model, wherein the common data model comprises (i) a plurality of rows associated with a plurality of data tables, and (ii) a plurality of columns associated with a plurality of data fields;

determining, by the one or more processors, one or more logical data type weights for respective one or more data table-data field pairs associated with the matrix representation;

generating, by the one or more processors, one or more disambiguation embeddings based on the matrix representation and the one or more logical data type weights;

generating, by the one or more processors, a set of one or more input embedding vectors for one or more prediction inputs based on the one or more disambiguation embeddings, wherein the one or more prediction inputs comprise one or more query sets, and wherein a query set of the one or more query sets comprises (i) a set of one or more candidate data tables selected from the plurality of data tables, and (ii) a data field of the plurality of data fields;

generating, by the one or more processors, one or more training embedding vectors for a training dataset based on the one or more disambiguation embeddings and one or more table-column relationship embeddings, wherein a disambiguation machine learning model is trained based on the one or more training embedding vectors;

providing, by the one or more processors, the set of one or more input embedding vectors to the disambiguation machine learning model to produce a set of one or more prediction vectors, wherein (i) a prediction vector of the set of one or more prediction vectors comprises a plurality of probability scores associated with a matching data field that corresponds to a data table of the plurality of data tables, and (ii) a probability score of the plurality of probability scores is associated with a candidate data table of the set of one or more candidate data tables;

assigning, by the one or more processors, one or more select data fields associated with the one or more query sets to respective one or more candidate data tables based on the set of one or more prediction vectors; and initiating, by the one or more processors, performance of one or more prediction-based actions based on the assigning of the one or more select data fields.

2. The computer-implemented method of claim 1, wherein the disambiguation machine learning model comprises a neural network machine learning network.

3. The computer-implemented method of claim 1 further comprising generating the one or more table-column relationship embeddings based on one or more rarity scores that are associated with one or more logical data types in accordance with the plurality of data tables.

4. The computer-implemented method of claim 1 further comprising determining the one or more logical data type weights based on (i) one or more mutual information scores between a logical data type and the data table, (ii) a frequency of one or more logical data types in accordance with the plurality of data tables, and (iii) one or more rarity scores of the logical data type in accordance with the plurality of data tables.

5. The computer-implemented method of claim 1, further comprising:

receiving feedback data associated with the assigning of the one or more select data fields; and re-training the disambiguation machine learning model based on the feedback data.

6. The computer-implemented method of claim 5, wherein re-training the disambiguation machine learning model based on the feedback data further comprises re-initiating a set of one or more model weights based on the feedback data.

7. The computer-implemented method of claim 1, wherein the one or more disambiguation embeddings correspond to the one or more logical data type weights and one or more table-column relationships associated with the plurality of data fields.

8. A system comprising one or more processors and one or more non-transitory computer readable media storing processor-executable instructions that, when executed by the one or more processors, cause the one or more processors to perform operations comprising:

generating a matrix representation of a common data model, wherein the common data model comprises (i) a plurality of rows associated with a plurality of data tables, and (ii) a plurality of columns associated with a plurality of data fields;

determining one or more logical data type weights for respective one or more data table-data field pairs associated with the matrix representation;

generating one or more disambiguation embeddings based on the matrix representation and the one or more logical data type weights;

generating a set of one or more input embedding vectors for one or more prediction inputs based on the one or more disambiguation embeddings, wherein the one or more prediction inputs comprise one or more query sets, and wherein a query set of the one or more query sets comprises (i) a set of one or more candidate data tables selected from the plurality of data tables, and (ii) a data field of the plurality of data fields;

generating one or more training embedding vectors for a training dataset based on the one or more disambiguation embeddings and one or more table-column relationship embeddings, wherein a disambiguation machine learning model is trained based on the one or more training embedding vectors;

providing the set of one or more input embedding vectors to the disambiguation machine learning model to produce a set of one or more prediction vectors, wherein (i) a prediction vector of the set of one or more prediction vectors comprises a plurality of probability scores associated with a matching data field that corresponds to a data table of the plurality of data tables, and (ii) a probability score of the plurality of probability scores is associated with a candidate data table of the set of one or more candidate data tables;

assign one or more select data fields associated with the one or more query sets to respective one or more candidate data tables based on the set of one or more prediction vectors; and initiate performance of one or more prediction-based actions based on the assignment of the one or more select data fields.

9. The system of claim 8, wherein the disambiguation machine learning model comprises a neural network machine learning network.

10. The system of claim 8, wherein the operations further comprise generating the one or more table-column relationship embeddings based on one or more rarity scores that are associated with one or more logical data types in accordance with the plurality of data tables.

11. The system of claim 8, wherein the operations further comprise determining the one or more logical data type weights based on (i) one or more mutual information scores between a logical data type and the data table, (ii) a frequency of one or more logical data types in accordance with the plurality of data tables, and (iii) one or more rarity scores of the logical data type in accordance with the plurality of data tables.

12. The system of claim 8, wherein the operations further comprise:

receive feedback data associated with the assignment of the one or more select data fields; and re-training the disambiguation machine learning model based on the feedback data.

13. The system of claim 12, wherein the operations further comprise re-training the disambiguation machine learning model by re-initiating a set of one or more model weights based on the feedback data.

14. The system of claim 8, wherein the one or more disambiguation embeddings correspond to the one or more logical data type weights and one or more table-column relationships associated with the plurality of data fields.

15. One or more non-transitory computer-readable storage media storing instructions that, when executed by one or more processors, cause the one or more processors to perform operations comprising:

generating a matrix representation of a common data model, wherein the common data model comprises (i) a plurality of rows associated with a plurality of data tables, and (ii) a plurality of columns associated with a plurality of data fields;

determining one or more logical data type weights for respective one or more data table-data field pairs associated with the matrix representation;

generating one or more disambiguation embeddings based on the matrix representation and the one or more logical data type weights;

generating a plurality set of one or more input embedding vectors for one or more prediction inputs based on the one or more disambiguation embeddings, wherein the one or more prediction inputs comprise one or more query sets, and wherein a query set of the one or more query sets comprises (i) a set of one or more candidate data tables selected from the plurality of data tables, and (ii) a data field of the plurality of data fields;

generating one or more training embedding vectors for a training dataset based on the one or more disambiguation embeddings and one or more table-column relationship embeddings, wherein a disambiguation machine learning model is trained based on the one or more training embedding vectors;

providing the set of one or more input embedding vectors to the disambiguation machine learning model to produce a set of one or more prediction vectors, wherein (i) a prediction vector of the set of one or more prediction vectors comprises a plurality of probability scores associated with a select matching data field that corresponds to a data table of the plurality of data tables, and (ii) a probability score of the plurality of probability scores is associated with a candidate data table of the set of one or more candidate data tables;

assign one or more select data fields associated with the one or more query sets to respective one or more candidate data tables based on the set of one or more prediction vectors; and initiate performance of one or more prediction-based actions based on the assignment of the one or more select data fields.

16. The one or more non-transitory computer-readable storage media of claim 15, wherein the operations further comprise generating the one or more table-column relationship embeddings based on one or more rarity scores that are associated with one or more logical data types in accordance with the plurality of data tables.

17. The one or more non-transitory computer-readable storage media of claim 15, wherein the operations further comprise determining the one or more logical data type weights based on (i) one or more mutual information scores between a logical data type and the data table, (ii) a frequency of one or more logical data types in accordance with the plurality of data tables, and (iii) one or more rarity scores of the logical data type in accordance with the plurality of data tables.

18. The one or more non-transitory computer-readable storage media of claim 15, wherein the operations further comprise:

receive feedback data associated with the assignment of the one or more select data fields; and re-training the disambiguation machine learning model based on the feedback data.

19. The one or more non-transitory computer-readable storage media of claim 18, wherein the operations further comprise re-training the disambiguation machine learning model by re-initiating a set of one or more model weights based on the feedback data.

20. The one or more non-transitory computer-readable storage media of claim 15, wherein the one or more disambiguation embeddings correspond to the one or more logical data type weights and one or more table-column relationships associated with the plurality of data fields.

* * * * *